Figure 1:
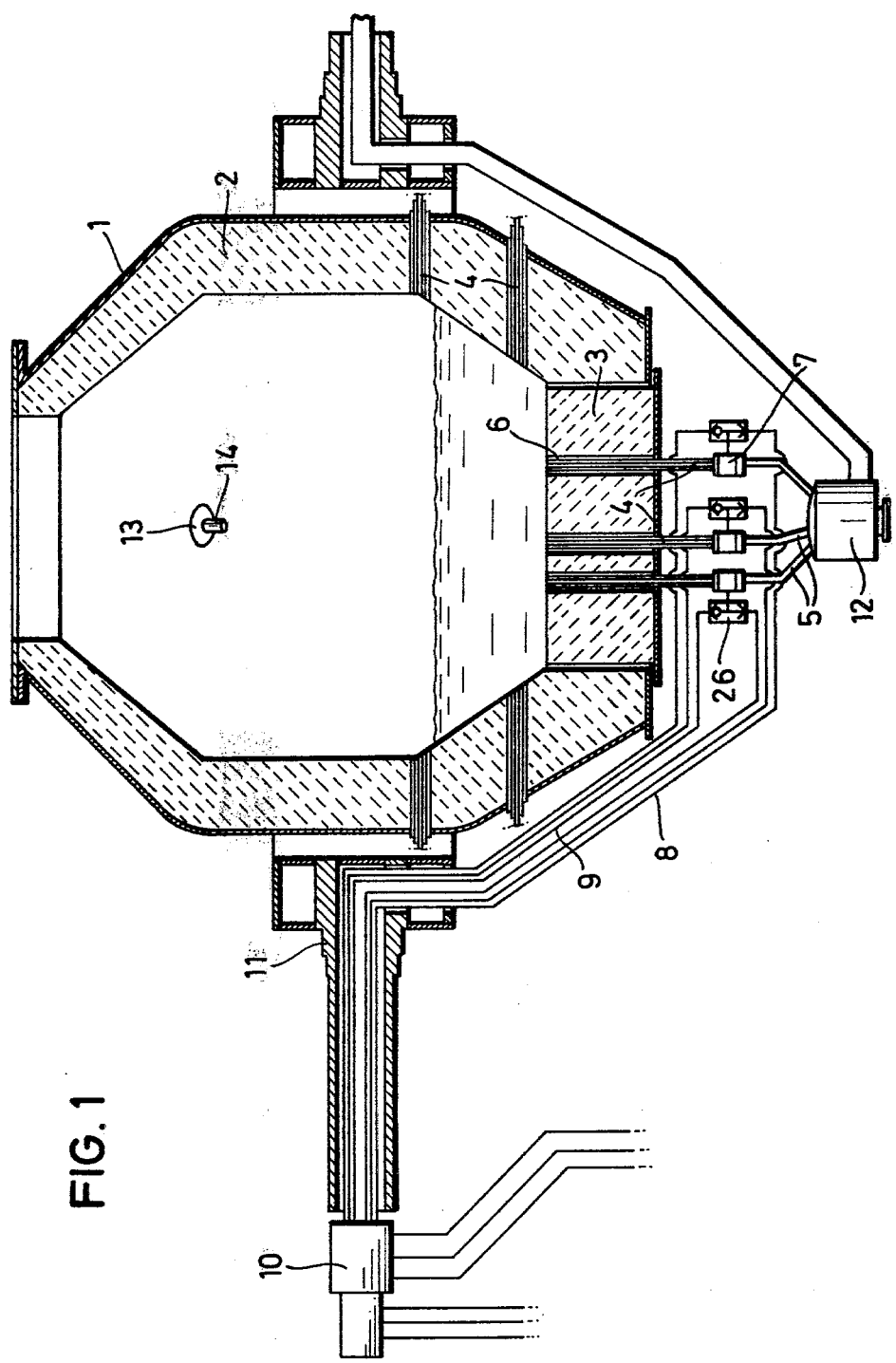

United States Patent [19]

Brotzmann et al.

[11] 4,198,230
[45] Apr. 15, 1980

[54] STEELMAKING PROCESS

[75] Inventors: Karl Brotzmann; Hans-Georg Fassbinder, both of Sulzbach-Rosenberg, Fed. Rep. of Germany

[73] Assignee: Eisenwerk-Gesellschaft Maximilianshutte mbH, Sulzbach-Rosenberg, Fed. Rep. of Germany

[21] Appl. No.: 902,469

[22] Filed: May 3, 1978

[30] Foreign Application Priority Data

May 4, 1977 [DE] Fed. Rep. of Germany ....... 2719981
May 4, 1977 [DE] Fed. Rep. of Germany ....... 2719981
Jul. 2, 1977 [DE] Fed. Rep. of Germany ....... 2729983
Dec. 17, 1977 [DE] Fed. Rep. of Germany ....... 2756432

[51] Int. Cl.² .................................. C21C 5/34
[52] U.S. Cl. ........................................ 75/60; 75/59
[58] Field of Search ........................... 75/59, 60

[56] References Cited

U.S. PATENT DOCUMENTS 3,695,863 10/1972 Metcalf .................................. 75/60
3,706,549 12/1972 Knuppel .................................. 75/60

Primary Examiner—P. D. Rosenberg
Attorney, Agent, or Firm—Lawrence I. Field

[57] ABSTRACT

A steelmaking process is described in which solid sources of iron (e.g. scrap) are charged into a convertor equipped with tuyeres through which air, oxygen or mixtures thereof can be blown into the convertor.

The process includes (1) a preheating phase in which carbon carriers (fuels) are burned in the convertor to produce hot combustion gases which pass upwardly through solid sources of iron, until the same is heated to an average temperature between about 1000° F. and 1200° C., (2) a melting phase during which the solid sources of iron are melted; and (3) a refining stage in which the melt is refined by oxygen blown into said melt in the usual way.

32 Claims, 2 Drawing Figures

STEELMAKING PROCESS

The invention relates to a steelmaking process using solid sources of iron, in particular scrap, in a convertor, into which oxidizing gases or oxygen surrounded by a protective medium are blown by means of tuyeres through the refractory brickwork.

A number of convertor processes are known in which pig iron is refined by top blowing or through blowing. Appreciable heat is generated from the oxidation of the elements present in the pig iron and this heat is used for melting cold scrap. For instance when making one ton of steel, 800 kg of a conventional pig iron containing 4.2% carbon, 1.0% silicon and 0.8% manganese and 300 kg of scrap are loaded into the convertor. Since scrap is generally available in large amounts and at favorable prices, while the winning of pig iron in the blast furnace is expensive and relatively costly, the attempt is made to use as much scrap as possible when making steel. A higher proportion of scrap is more economical and avoids a corresponding enlargement of blast furnace capacity.

In addition to scrap, suitable solid sources of iron applicable to the convertor process and available at fairly favorable prices include pre-reduced pellets, sponge iron or solid pig iron. Their use, as is true for scrap, leads to increasing the steelmaking capacity without entailing an enlargement of the blast furnace capacity.

The upper limit of the proportion of scrap which can be used is limited by the exothermal oxidation of the elements present in the pig iron, that is, by the heat released by the burning of the silicon, carbon and other oxidizable elements usually present in the pig iron. To use more scrap, the attempt has been made for instance to melt the scrap using a burner with a saucer-like flame in a special scrap melting apparatus, and to subsequently refine the melt in a convertor together with liquid pig iron to obtain steel. This process, however, is complicated because it requires a special scrap melting apparatus and because much time is required to melt the scrap using the saucer-like burner flame. Furthermore, there is some risk in loading the scrap melt, even when already partly pre-refined, into a pig iron melt already present in the convertor, considering the high potential of oxidation of a scrap melt of low carbon content in the presence of a pig iron melt with a high carbon content.

Again the preheating of scrap in a converter using a natural gas or oil/oxygen lance burner is resorted to only occasionally because the approximate thermal efficiency of 30% of the fuels is low and because of the appreciable wear suffered in the refractory lining due to the relatively long preheating time, the converter furthermore being unavailable for refining during this preheating period. If there is a ratio of preheating time to refining time of 2:3, the preheating of the scrap is then at the cost of converter output.

The invention therefore addresses the task of providing a steelmaking process using higher than usual proportions of solid sources of iron such as scrap, prereduced pellets, sponge iron and solid pig iron, and which provides a relatively fast heating of the solid sources of iron accompanied by high thermal efficiency and low iron losses due to oxidation, plus a relatively low temperature of the exhaust gases and therefore an improved life of the refractory brickwork. Depending on the economics a charge of even 100% of scrap may be used.

This problem is solved according to the present invention (1) by blowing an oxidizing gas, i.e. oxygen, air or mixtures thereof, through tuyeres mounted in the lower region of the converter and burning therewith carbon carriers in an arrangement such that the resulting hot combustion gases flow through the pile of solid sources of iron by said combustion gases, (2) subsequently melting the solid sources of iron, and (3) then refining the melt in the same convertor by the use of oxygen as the refining means.

The process of the invention offers high thermal efficiency and a very brief time of preheating because the hot combustion gases flow through the pile of the solid sources of iron and transfer an appreciable part of their heat due to the intimate contact and the large surfaces of contact. The exhaust gas temperature in the upper part of the convertor is relatively low and therefore the wear in the refractory lining is also slight. The use of several tuyeres in the convertor bottom or at the lower part of the side wall for the combustion of carbon carriers furthermore provides a very uniform distribution of the hot combustion gases through the pile of the solid source of iron.

The sequences taking place in the process of the invention may be divided approximately into three phases: a first phase, hereafter designated as the preheating phase, in which the scrap is heated to an average temperature of about 1100° C., without there being a substantial formation of liquid steel and in which the oxidizing combustion gases are predominantly present; a second phase, denoted as the melting phase, in which a large part or the entire mass of the solid charge is melted and in which the composition of the exhaust gases becomes much less oxidizing than the composition of the exhaust gases during the preheating phase; and finally the refining phase proper, in which the amount of carbon and other elements present in the melt is decreased by means of oxygen in the known manner.

Gaseous or liquid carbon carriers such as natural gas or methane, propane, butane, benzol, crude oil, fuel oil, crude tar and refinery residues are especially suitable for preheating. These materials may be fed through the annular gaps of tuyeres made of concentric pipes, in which an oxidizing gas, such as air, oxygen or mixtures thereof is blown into the convertor through the center pipe. In this process the proportion of refining gas to the gaseous or liquid carbon carriers acting as protective media is changed with successive phases of the process of the invention. For instance, at the beginning of the preheating phase, liquid or gaseous carbon carriers are introduced in proportions required for about a stoichiometric combustion with the oxidizing gases to form $CO_2$ and $H_2O$, while in the refining phase hydrocarbons are introduced only in such amounts as are needed to protect the tuyeres. It may be appropriate to switch one or more often from liquid to gaseous carbon carriers.

In addition to being introduced through the tuyeres also serving for the refining, the gaseous or liquid carbon carriers may be introduced through special supply systems, for instance through a pipe in the taphole of the convertor. Liquid carbon carriers such as petroleum, fuel oil or light oil then flow down along the convertor wall to burn with the oxygen issuing from the tuyeres in the convertor bottom or at the lower part of the convertor wall.

It is essential in all cases that the combustion of the carbon carriers take place as close to the convertor bottom as possible and especially below the solid sources of iron, so that the hot combustion gases when flowing upward follow a relatively long path through the solid sources of iron.

One important aspect of the invention consists in using the described, short-term preheating of the solid sources of iron, in particular scrap, for the increase of the scrap proportion, in the conventional convertor refining processes. The OBM/Q-BOP convertors, described for example in U.S. Pat. No. 3,706,549 issued Dec. 19, 1972 and which comprise tuyeres for introducing oxygen surrounded by a protective medium below the bath surface, have been found to be particularly suitable.

Preferably liquid carbon carriers are introduced into the convertor through the annular gaps in the multiple pipe tuyeres during preheating and gaseous carbon carriers, for instance 1% by volume of propane or 5-10% by volume of natural gas referred to the oxygen are introduced into the convertor through the annular gaps during refining. The switch over from the liquid to gaseous carbon carriers takes place during the melting phase, or at the beginning of the refining phase.

Liquid carbon carriers, in particular oil, are fed through the annular gap of the tuyere into the converter at a rate of 10-10 liters a minute per ton of solid source of iron. Simultaneously an oxidizing gas flows through the inside pipe of the tuyere at a rate of 1.5-2.5 Nm$^3$ of oxygen per liter of liquid carbon carrier. The tuyeres are operated according to the invention as burners during the preheating time. One advantageous tuyere design useful in the invention comprises conventional tuyeres consisting of concentric round pipes, the tuyere annular gap being ordinarily 1 mm wide or tuyeres consisting of individual channels of approximately square cross section with the sides 2-3 mm long. Gaseous protective media are passed through the annular gap following the preheating period and during the melting of the solid sources of iron and the refining of the melt, for instance 1% by volume of propane, referred to the oxygen. In practical operation, the protective media were found to be problem-free and very reliable for the refining phase.

During the refining phase, from 15,000 to 18,000 Nm$^3$ per hour of oxygen are made to pass through the inner pipes of ten tuyeres of a 60 ton convertor, for instance, and simultaneously about 300 Nm$^3$ per hour of propane are blown through the annular gaps of these tuyeres. According to the invention, the switch-over from a liquid to a gaseous medium in the tuyere annular gap and vice-versa can take place at any selected time, without interrupting the convertor process.

Again, when liquid hydrocarbons are used as the tuyere protective media during the melting and the refining phases, for instance when the rates in the above converter of 60 tons are about 1000 liters per hour of fuel oil for a chosen oxygen rate of about 16,000 Nm$^3$ per hour, the tuyeres are operated with nitrogen or an inert gas in the inside pipe and in the annular gap at least during tilting and erecting the convertor. Accordingly the sense of the invention also includes the switching to and from gaseous media when using liquid tuyere protective media.

According to the invention, the proportion of scrap, defined as the weight ratio of cold scrap to liquid steel, may be increased by about 10%, for instance from about 30% to 40%, when the solid sources of iron in the convertor are heated in the manner described. The addition of solid carbon carriers, for instance coke, during the preheating phase is not required. For instance in a 60 ton convertor, for which the tapping weight of the finished steel melt was 60 tons, the scrap proportion could be increased from the conventional value of 28% to 38%, namely from 17 tons to 23 tons. To preheat this amount of solid sources of iron, 450 liters of fuel oil were blown into the convertor through the annular gaps of the ten tuyeres for five minutes in conjunction with 1000 Nm$^3$ of oxygen. These figures show a thermal oil efficiency of about 70%. Therefore it was possible to transfer about 170,000 kcalories per ton of solid source of iron. This is equivalent to an average effective preheating temperature of about 1050° C. for the solid sources of iron. Following the preheating period of five minutes, 43 tons of pig iron are poured into the 60 ton convertor and the melt is refined to completion in about eight minutes.

When using gaseous carbon carriers, mostly natural gas, for the preheating, no design changes for the tuyere supplies to these convertors are required. It is advantageous however to use liquid carbon carriers during the preheating period and to switch subsequently to gaseous tuyere protective media.

This preheating technique of the invention can be carried out in less than ten minutes and preferably is performed within 2-5 minutes; it allows increasing the use of solid sources of iron in steelmaking by up to 10% and ordinarily up to a scrap proportion of about 40% without sensible losses in production time. This entails appreciable economic advantages in steelmaking.

A further increase in the proportion of solid sources of iron, mainly scrap, exceeding an increase in scrap of 10% is possible, since steelmaking from scrap without using any liquid pig iron can be accomplished by melting of the solid sources of iron. Solid carbon carriers, mainly coke, graphite, coals such as anthracite and mixtures thereof, are preferably loaded into the convertor for this premelting phase. After this time the proportion of CO in the convertor exhaust gas also increases.

The gaseous and liquid carbon carriers flowing through the annular gaps of the tuyeres may be diminished to the proportion of less than 10% by weight, referred to the oxygen, which is required to protect the tuyeres.

It is within the scope of the invention to charge solid carbon carriers together with the solid sources of iron. However it is particularly advantageous to introduce the solid carbon carriers following the preheating phase onto the preheated solid sources of iron in the convertor. It is advantageous for the purpose of increasing thermal efficiency to preheat the solid carbon carriers, for instance coke, before loading the same.

The amount of solid carbon carriers loaded into the convertor increases in the process of the invention as the amount of solid sources of iron and the length of the preheating increase. Thus 20 kg of coke per ton of scrap suffice to increase the scrap proportion by another 10% beyond the increase in scrap proportion achieved by preheating, for instance from 40% to 50% scrap. To increase the scrap proportion by another 60%, that is, for a steel melt of 100% scrap, the amount of solid carbon carriers increases approximately linearly to 120 kg of coke per ton of scrap.

When at least some coke is initially charged with the solid sources of iron the consumption of solid carbon carriers is relatively small in the preheating phase because the coke reacts differently with the exhaust gases presumably consisting of carbon dioxide and water vapor, possibly of nitrogen too, than with free oxygen gas. Thus the coke essentially is merely heated during the preheating phase, while in the melting phase, during which the proportion of oxygen to fluid carbon carriers increases, it reacts with free oxygen or oxygen bound to oxides in an overall exothermal process to become CO. Thus the exhaust gas in the region of the convertor above the charge of solid sources of iron contains CO only beyond approximately 1000°–1200° C., that is, in the melting phase, and from this time the melting heat is obtained principally from the combustion of solid carbon carriers, e.g. coke or anthracite coal. Therefore it is not necessary to introduce the solid carbon carriers until that time. A small body of liquid melt is present in convertor by this time so that part of the carbon will be dissolved in the melt and later refined out of the liquid iron.

As soon as a melt has been formed, the solid carbon carriers may also be blown through the tuyeres into the convertor in the form of powders with carrier gases, for instance nitrogen or argon, during the melting phase. This allows a particularly fast combustion and an extremely effective heat transfer to the sources of iron which remain in part solid and are already in part liquid.

Other solids, especially slag forming agents, for instance lime dust, preferably are blown in during the refining phase entrained in the oxygen gas, as described in U.S Pat. No. 3,771,998 issued Nov. 13, 1973.

Carbon carriers in powder form and other powders, and combustible or inert gases also may be fed centrally to the stream of oxygen gas for instance by a special feed pipe located inside of the oxygen pipe. It is also practical to use several concentric pipes and an annular gas as the oxygen supply channel. Tuyeres as shown in German Patent No. 24 38 142 have also been found suitable for carrying out the process of the invention.

The process of the invention additionally may be practiced by blowing oxygen surrounded by hydrocarbons through tuyeres made of concentric pipes and located above the bath surface, below the pivot of the convertor and passing through the refractory brickwork of the convertor vessel. The ratio of hydrocarbon to oxygen during the refining phase preferably is less than 10% and for instance may be between 0.5 and 5% by weight, preferably between 1 to 2% by weight. This oxygen is used primarily to burn the carbon monoxide generated in increasing amounts from the beginning of the melting phase as it leaves the solid sources of iron or the melt so as to at least partly form carbon dioxide. The oxygen may be blown in during the preheating phase as air and during the melting phase as industrially pure oxygen. In some instances, it may be found to be desirable to feed more than 10% by weight of hydrocarbons during the preheating phase.

This group of tuyeres may be mounted at the cylindrical center of the convertor, for instance at a height of about 1 to 1½ meters, preferably 1.2 meters above the bottom for a newly prepared convertor. The elevation of these tuyeres allows continuing the operation of the burner beyond the time the refining tuyeres, which are mounted in the convertor bottom or slightly above the convertor bottom for example, from 20 to 80 cm, preferably 50 cm above the convertor bottom in the side wall, are switched over to pure refining operation, that is, to a proportion of hydrocarbons less than 10% with respect to the oxygen. In this manner, it is possible to extend burner operation of the tuyeres mounted above the bath surface to the beginning of the refining phase.

Only then is the amount of oxygen raised with respect to that of the hydrocarbons to obtain as extensive as possible combustion of the carbon monoxide above the melt.

The duration of the preheating and melting phases of the solid sources of iron depends on the particular amount of scrap charged into the convertor vessel and varies between 2 and 20 minutes. Following preheating, unless a 100% scrap charge is involved, liquid pig iron is charged into the convertor. The liquid pig iron together with the melt obtained from the scrap upon further heat from the refining action ensures rapid fusion of the remaining solid scrap. Thus for instance up to 800 kg of scrap per ton of steel may be preheated and melted and subsequently at least 300 kg of liquid pig iron per ton of steel may be charged into the same convertor. In this case the preheating period lasts five minutes, the melting period fifteen minutes and the refining time proper is only four minutes. For smaller proportions of scrap per ton of steel and greater amounts of pig iron, the preheating and melting periods are correspondingly shortened and the refining time for instance is prolonged to eight to ten minutes.

For small proportions of pig iron of 200 to 300 kg per ton of steel, there would be a danger of explosive reactions due to the large difference in oxidation potential between the melt obtained from the scrap and the subsequently charged pig iron. However this danger does not arise in the case of the process of the present invention because the melt obtained from melting the scrap continuously absorbs carbon from the solid carbon carriers which are present.

The process of the invention is carried out in a convertor with tuyeres consisting of at least two concentric pipes installed in the refractory lining of the convertor. These tuyeres may be mounted in a convertor bottom, e.g. as shown in U.S. Pat. Nos. 3,706,549 issued Dec. 19, 1972 or as shown in 4,047,707 issued Sept. 13, 1977 they may be mounted in the side wall of the convertor below and/or above the bath surface, and also in the region of the convertor hood. The tuyeres mounted below the bath surface may consist of four concentric pipes, whereby they form three annular gaps between the convertor pipes. A gaseous protective medium, for instance, propane, may be blown in through the outermost annular gap while liquid carbon carriers such as oils of different viscosities and preheating temperatures are fed through the other annular gaps, the oxygen required for heating and refining being supplied through the central pipe. During the preheating phase air or oxygen-enriched air is blown through the central pipe. During the melting and refining phases it is preferred that oxygen gas is blown in, said oxygen being at least part of the time loaded with lime dust and other slag forming agents.

It is important that the tuyeres be connected outside the convertor through switch-over valves to at least two individual lines in each case, one for gaseous and the other for liquid protective media or carbon carriers, so as to be able to switch from one medium to the other as a function of the individual phases of the process of the invention, for instance from nitrogen to oil and again to nitrogen and then to propane for the refining phase.

The switching from one fluid medium to another preferably takes place using a three way valve directly mounted on the assembly flange of the tuyere, the exhaust aperture of said valve being connected to the annular gap of the tuyere, while one of the two intake orifices communicates with a feed line for a liquid carbon carrier or a liquid protective medium, the other input orifice communicating with a feed line for a gaseous carbon carrier or a gaseous protective medium. By means of this device one obtains rapid switch-over from one medium to another.

Individual tuyeres also may be provided entirely with fluid carbon carriers during the preheating and/or melting phases, when the convertor is in a vertical position.

Figure 2:
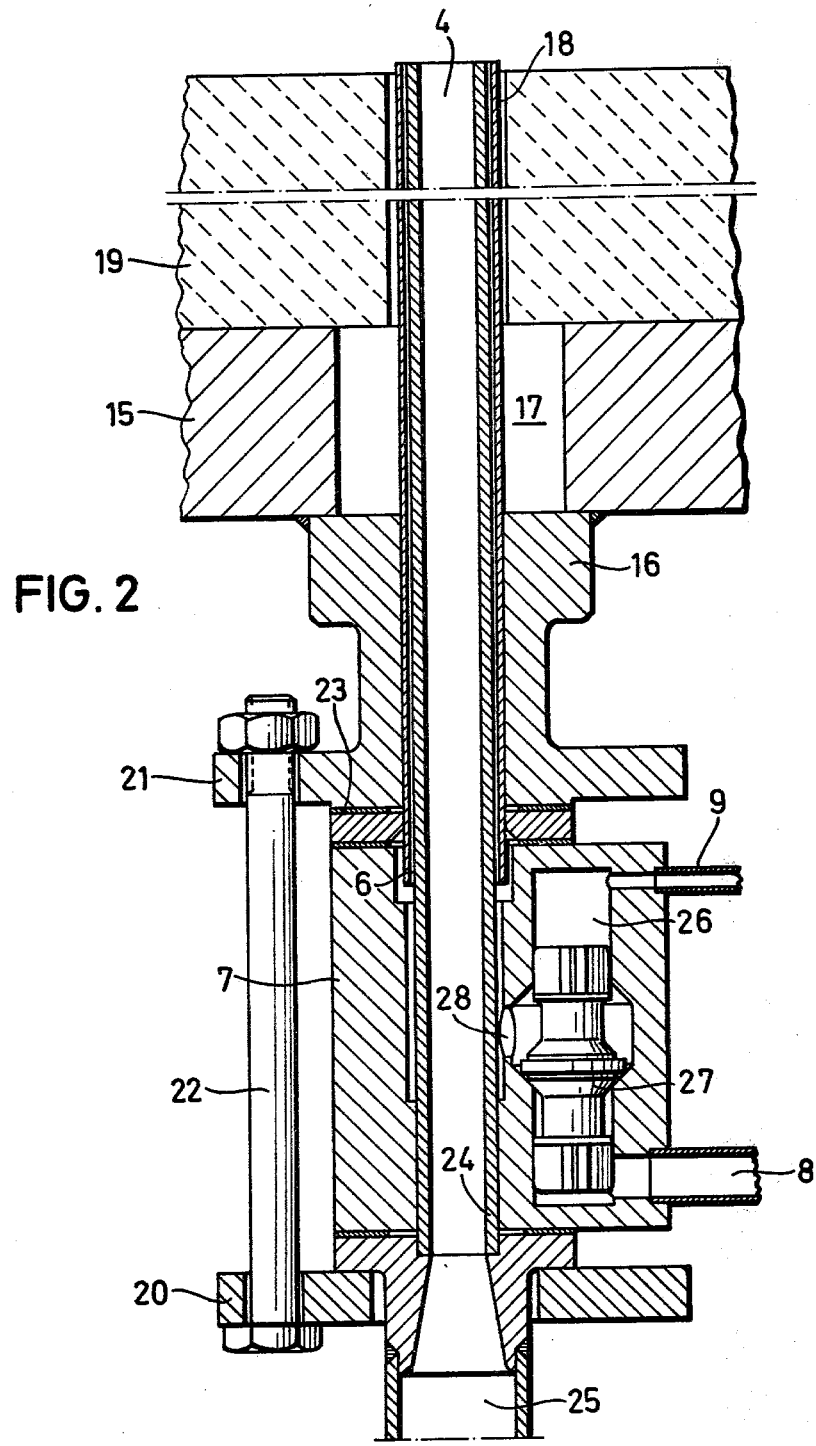

The process aspect of the invention is described below in further detail in relation to various embodiments which are not intended to limit the invention and the oxygen blow through convertor comprising the invention is shown in the drawings forming a part of the present application, in which:

FIG. 1 is a schematic vertical longitudinal section through an OBM convertor equipped with several sets of tuyeres; and FIG. 2 is an axial lengthwise section through one of the bottom tuyeres with a switch over valve for the media supply to the tuyere annular gaps between the concentric tuyere pipes.

As shown in FIG. 1, convertor 1 comprises a refractory lining 2 with side wall tuyeres 4' and an exchangeable bottom 3 with bottom tuyeres 4. Each tuyere is connected to a feed line 5 for an oxidizing gas which may be charged with powder. This is implemented by a powder distributor 12. The annular gap 6 of each tuyere 4 having a width of about 1 mm is connected by an assembly piece 7 both to a gas supply line 8 and to a liquid supply line 9. Lines 8,9 pass through a multiple swivel joint 10 installed in the convertor trunnion 11 and are connected with supply lines in which are mounted control valves (not shown).

A feed tube 14 for liquid carbon carriers projects through tap hole 13. Additional tuyeres 4" are located in a side wall of the convertor above the bath surface. Oxygen preferably surrounded by a protective medium for the after burning of carbon monoxide is blown into the convertor through these tuyeres 4".

Each bottom tuyere 4 is secured to the convertor bottom plate 15 (FIG. 2) by means of a welded guide piece 16. Tuyeres 4 project through a bore 17 in bottom plate 15 and extend through a bore 18 in a convertor bottom 19. Tuyere 4 is clamped between a tuyere flange 20 and a mating flange 21 on the guide piece 16 by means of bolts 22 and seals 23. The innermost pipe 24 of tuyere 4 is connected with a feed line 25 for a refining gas or for a suspension of powder in a refining gas. Annular gap 6 is connected by means of a switch-over valve 26 selectively with the feed line 8 for a gaseous medium such as argon, nitrogen and/or gaseous hydrocarbons or with a feed line 9 for liquid media such as oil. A valve body 27 in switch-over valve 26 connects the exhaust orifice 28 with the annular gap 6 of tuyere 4 to either the liquid medium supplied through line 9 or the gaseous medium supplied through line 8.

The side wall tuyeres are similarly secured to the steel casing of the convertor and connected to feed lines, there being no connection to the powder distributor 12 for the tuyeres 4" which are located in the side wall above the bath surface.

The following is a specific example of the present invention.

22 tons of scrap were loaded into a 60 ton convertor of the kind shown in FIGS. 1 and 2 of approximately spherical cross section equipped with ten bottom tuyeres and having a volume of 0.8 $Nm^3$ per ton of steel. The scrap consisted of 2 tons of bales of sheets or plates, 10 tons of mill scrap from the rolling mill and 10 tons of mixed scrap. After the scrap was loaded into the convertor, during turnup of the convertor, the bottom tuyeres were supplied with nitrogen at rates of 8000 $Nm^3$ for the inside pipe and 600 $Nm^3$ for the annular gaps, per hour. After rotating the convertor back into its vertical (upright) position the nitrogen supply was changed over so that the inside pipes of the tuyeres were provided with 13,000 $Nm^3$ per hour of oxygen and the annular gaps were supplied with 6000 liters of oil per hour. Following a preheating time of five minutes with oxygen and oil, there was a switch over to nitrogen again, and the convertor was pivoted into the horizontal position and charged with 44 tons of molten pig iron containing 3.6% carbon, 0.7% silicon, 1.1% manganese and 1.6% phosphorus. This took two minutes, whereupon the convertor was pivoted back into the vertical blowing position while introducing nitrogen through the tuyeres to prevent inflow of metal into the tuyeres. Once the convertor was upright, there was a switch over to 18,000 $Nm^3$ an hour of oxygen and 350 $Nm^3$ an hour of propane for ten minutes. After a pause of three minutes for steel analysis, further refining was carried out for two minutes under the same conditions. The overall consumption of oxygen amounted to 4200 $Nm^3$, that of the blown in lime dust was 5 tons and that of propane was 70 $Nm^3$. The amount of steel tapped was 60 tons and analysis showed 0.02% of carbon and 0.2% of manganese.

For a comparative charge with the same pig iron analysis, only 16 tons of scrap and correspondingly 50 tons of pig iron could be charged when following the prior art procedure. Accordingly the additional amount of scrap which could be processed in the heat made according to the present invention amounts to 6 tons, requiring for its preheating a heat of 4.35 Gcal which was provided by burning with oxygen the oil fed through the annular gaps. This heat also includes a part corresponding to the heat gain obtained from that quantity of pig iron from the oxidation of the iron companion elements which is replaced by additional scrap. Overall the thermal efficiency of the supplied oil is 64%.

As regards further heats about 100 in number, each with an additional quantity of 6 tons of scrap or a scrap proportion of 36%, the preheating periods on the average amounted to five minutes and resulted in an average thermal efficiency of 65%.

In all cases a two slag operation was followed, which is preferred when refining phosphorus rich pig iron. There remains in such a case the entire slag, on the average about 7 tons, at the end of refining, for the following charge in the convertor. The cold scrap loaded into the slag was heated by the slag to a temperature of 700° C. and subsequently preheated to 1100° C. When refining without changing the slag, the additional scrap may be raised to 25 tons, which corresponds to an increase in the scrap proportion from 26% in conventional refining in the OBM converter to 41%, that is, an increase of 15%. This further increase in scrap proportion is predicated on cold scrap being raised in temperature with higher thermal efficiency than scrap preheated by the final slag remaining in the convertor.

In a further comparative example, 19 tons of scrap and 47 tons of pig iron containing 3.5% carbon, 1.0% silicon, 1.0% manganese and 2% phosphorus were first charged into the 60 ton convertor of FIGS. 1 and 2 and then conventionally refined by means of bottom tuyeres 4, using oxygen surrounded with propane, the latter present at 3% by volume with respect to the oxygen, for ten minutes, corresponding to a total heat time of thirty-five minutes, into 60 tons of steel containing 0.03% carbon, 0.10% manganese and 0.025% phosphorus.

When operating the same convertor in accordance with the present invention it was possible to load 33 tons of scrap and 1.6 tons of coke into the convertor and to preheat these for six minutes with an oil consumption of 600 liters and an oxygen consumption of 3000 Nm$^3$. After preheating the cold charge, 33 tons of molten pig iron containing 3.5% carbon, 1.0% silicon, 1.0% manganese and 2% phosphorus were poured into the convertor and the melt was terminally refined for a total heat time of forty-one minutes under the same conditions. The time of preheating was increased by six minutes. However, the advantage obtained was in using 33 tons of scrap in lieu of 19 tons.

For a heat made without liquid pig iron in the 60 ton convertor with ten bottom tuyeres, a total of 40 tons of scrap of varying nature and with an iron content of 93%, corresponding to 38 tons of iron, was charged into the convertor together with 6 tons of blast furnace coke. The tuyeres were loaded with nitrogen during the tilting of the convertor to an upright position, whereafter the tuyere supply was switched over to 10,000 Nm$^3$ an hour of oxygen and 3% by volume of propane. When the convertor was in the vertical position, a pipe 14 projecting through the tap hole 13 was fed with 150 liters of light fuel oil and at a flow rate of 50 kg a minute, for the purpose of increasing the supply of carbon carriers and to simultaneously achieve larger surface ignition of the coke. The oxygen rate during the preheating of coke was gradually increased to 15,000 Nm$^3$/hr. After a total consumption of oxygen of 7000 Nm$^3$, the generation of gases dropped markedly, indicating the complete combustion of the coke. After a total of 20 minutes, the bath temperature was 1620° C. and the bath analysis showed 0.10% carbon, 0.10% manganese, 0.03% phosphorus and 0.15% sulfur. Thereupon an after blowing was conducted for 1½ minutes with 300 Nm$^3$ of oxygen loaded with a total of 2000 kg of lime and the same amount (3% by volume) of propane. The final analysis of the steel showed 0.02% carbon, 0.05% manganese, 0.10% phosphorus and 0.04% sulfur for a time of treatment of forty minutes and a quantity of steel of 35 tons and a tap temperature of 1640° C.

In another batch with the same input materials but lacking coke, a total of 750 liters of oil at a flow rate of 75 liters a minute was fed into the convertor following its rotation to an upright blowing position; and the tuyeres were simultaneously supplied with a stoichiometric amount of oxygen of about 150 Nm$^3$ a minute. After ten minutes the scrap temperature was 1100° C. and 3.5 tons of coke were loaded. After another twenty minutes of blowing at a rate of about 200 Nm$^3$ of oxygen a minute and with 2% by volume of propane to protect the tuyeres, the entire batch was liquefied and could be tapped after a total time of blowing of thirty-eight minutes to obtain 36 tons of steel of the previously stated analysis.

Another heat was made without pig iron, as follows: 66 tons of scrap and 6.5 tons of blast furnace coke were loaded into the 60 ton convertor. During the preheating phase of twelve minutes, 220 Nm$^3$ per minute of oxygen were passed through the ten bottom tuyeres each consisting of two concentric pipes and 100 liters a minute of oil were passed through the annular gaps. Subsequently the oxygen rate was raised to 340 Nm$^3$ per minute and the oil rate lowered to 20 liters a minute during the melting phase. After another eighteen minutes, the scrap had completely melted, the bath temperature was 1600° C. and the steel analysis was 0.05% carbon, 0.5% manganese, 0.03% phosphorus and 0.09% sulfur. The steel was tapped and desulfurized conventionally in a ladle. For a ferrous oxide content of the slag of 7% the yield was a very good 91%.

In another heat in a convertor in which there were two additional tuyeres in the side wall of the convertor located over the trunnions and 50 cm above the convertor bottom, consisting each of one central pipe 50 mm in diameter for oxygen and of a concentric pipe 54 mm in diameter. The same amount of scrap as in the previous example but only 4 tons of coke were loaded into the convertor and 300 Nm$^3$ per minute of oxygen were fed through the inside pipes of the tuyeres and 100 liters of oil a minute through the annular gap during the fifteen minute long preheating. In the second phase, the oxygen rate was raised to 340 Nm$^3$ per minute and the oil flow rate lowered to 20 liters a minute. The second phase lasted for twelve minutes. Thereupon a steel of similar analysis and temperature was tapped.

A further heat was refined in similar manner, except that no coke was loaded initially with the cold scrap; instead 3 tons of coke preheated to 900° C. were loaded after ten minutes of preheating, that is, at approximately the end of the scrap preheating phase. After the loading of the hot coke, the batch was terminally refined for ten minutes and resulted in a steel of approximately the same analysis as in the two previous examples.

If pig iron is loaded in the process of the invention after preheating the solid sources of iron, then there results an increase of 10% in the proportion of scrap to about a proportion of 40% scrap. This involves practically no extension of the batch sequence time (tap-to-tap). The additional amount of scrap which is utilized therefore results in higher productivity. This is a particularly advantageous application of the process of the invention.

A further increase in scrap proportion is achieved if the preheating is followed by a melting phase in the presence of solid carbon carriers prior to the addition of the pig iron. This procedure offers the possibility of practically increasing the scrap proportion arbitrarily, for instance 50 to 60%. Therefore the process of the invention can replace the open hearth process, since it can utilize the same proportions of scrap and consequently open hearth plants may be converted to the more economical oxygen blow through convertors (OBM or Q-BOP convertors) without requiring any increase in the pig iron capacity. If it should happen, that due to an operational breakdown of the blast furnace, no liquid pig iron at all is available for a time, then the process of the invention may be carried out entirely with solid sources of iron, in particular scrap.

In all these variations of the process of the invention, the intensive motion of the bath of the melt and the consequently possible good heat transfer between melt and scrap contribute significantly to problem free and rapid liquefaction of the solid sources of iron.

In the above the symbol Nm$^3$ represents normal cubic meters at standard temperature (273° K.) and pressure (760 mm Hg).

Having now described preferred embodiments of the process and apparatus of this invention it is not intended that it be limited except as may be required by the appended claims.

We claim:

1. A steelmaking process characterized by the economical utilization of increased proportions of solid sources of iron in a convertor into which an oxidizing gas selected from the group consisting of air, oxygen and mixtures thereof is blown into the convertor through the refractory lining of the convertor by means of tuyeres located in said lining, which process comprises:

charging at least one solid source of iron selected from the group consisting of scrap, prereduced pellets of iron, sponge iron, pig iron and mixtures thereof into said convertor, so as to form a pile of said solid source of iron in said convertor;

preheating said solid source of iron by blowing said oxidizing gas through tuyeres mounted in the lower region of the convertor and supplying carriers of carbon during this preheating phase and thereby burning said carrier of carbon with said oxidizing gas thereby forming hot gaseous combustion products, the relative proportions of said carrier of carbon and of said oxidizing gas being such that said hot products of combustion are essentially $CO_2$ and $H_2O$ during said preheating;

flowing said hot combustion products upwardly from the bottom of said pile of the solid sources of iron, thereby preheating said pile;

and then melting said solid sources of iron while blowing said oxidizing gas through said tuyeres and said melt in proportions such that the composition of the exhaust gases becomes less oxidizing than the composition of the products of combustion produced during the preheating phase;

and thereafter refining the melt in the same convertor by means of oxygen blown into said melt, through said tuyeres located in said lining while said tuyeres are protected with hydrocarbon in amounts sufficient to control tuyere burnback.

2. A process according to claim 1, including the step of introducing fuel oil, other petroleum ingredients such as refinery residues from crude oil distillation, crude tar and mixtures thereof, into the convertor.

3. A process according to claims 1 or 2 including the step of introducing methane, natural gas, propane, butane and similar energy rich gases and mixtures thereof through the tuyeres into the convertor.

4. A process according to any of claims 1 through 3 wherein said tuyeres consist of at least two concentric pipes and the tuyeres are used as burners during the preheating phase.

5. A process according to claim 4 which includes introducing liquid hydrocarbons through the annular gap which exists between said concentric pipes.

6. A process according to any of claims 1 through 5 wherein the preheating of the solid sources of iron is performed until the average temperature of said solid sources of iron is between about 1000° C. and 1200° C.

7. A process according to any of claims 1 through 6 wherein an amount of liquid hydrocarbon is supplied to said convertor during the preheating phase which is from 1 liter to 10 liters per minute per ton of solid source of iron.

8. A process according to claim 7 which includes introducing said oxidizing gas through the tuyeres into the convertor at a rate of 1.5 to 2.5 $Nm^3$ of oxygen per liter of hydrocarbon for the purpose of burning said hydrocarbon.

9. A process according to any of claims 1 through 8 which includes charging liquid pig iron into the convertor following the preheating of the solid sources of iron.

10. A process according to any of claims 1 through 9 including charging solid carbon carriers into the convertor following the preheating of the solid sources of iron, when the tuyeres in the convertor bottom are covered by a melt.

11. A process according to any of claims 1 through 10 including the step of charging solid carbon carriers into the convertor in the form of coke, graphite, coal such as anthracite and mixtures thereof.

12. A process according to any of claims 1 through 11, including the step of charging at least some solid carbon carrier onto the preheated solid source of iron after it has been preheated.

13. A process according to any of claims 1 through 12 wherein the amount of solid carbon carriers charged into the convertor is increased as the amount of solid sources of iron and the length of the time of preheating are increased.

14. A process according to any of claims 1 through 13 including the step of charging from 10 to 150 kg of solid carbon carrier per ton of solid sources of iron into the convertor.

15. A process according to any of claims 1 through 14 including the step of preheating the carbon carriers introduced into the convertor.

16. A process according to any of claims 1 through 15 wherein the amount of gaseous or liquid carbon carriers, preferably hydrocarbon fed through the tuyeres after the preheating phase is decreased to the proportion required to protect the tuyeres, namely to less than 10% by weight of the oxygen fed through the tuyeres.

17. a process according to any of claims 1 through 16 including the step of switching once or more often from liquid protective media for the tuyeres or from liquid carbon carriers to gaseous protective media for tuyeres or gaseous carbon carriers.

18. A process according to any of claims 1 through 17 including the steps of blowing liquid carbon carriers through said tuyeres and into said convertor during the preheating and blowing gaseous carbon carriers through said tuyeres during the melting and refining phase through said tuyeres and into said converter.

19. A process according to any of claims 1 through 18 wherein the preheating of the solid sources of iron is followed by a premelting phase.

20. A process according to claim 19 wherein liquid carbon carriers are introduced into the convertor during said preheating and solid carbon carriers are introduced into the convertor for said premelting phase.

21. A process according to any of claims 1 through 20 including the step of blowing powdered carbon carriers into the convertor by means of a carrier gas.

22. A process according to any of claims 1 through 21 including the step of blowing oxygen surrounded by a protective medium through said tuyeres and below the bath surface during the premelting and the refining phases.

23. A process according to any of claims 1 through 22 including the step of blowing oxygen through the tuyeres into the convertor at a rate of from 1 to 8 Nmhu 3 per minute per ton of steel, preferably between 2 and 5 $Nm^3$ per minute per ton of steel.

24. A process according to any of claims 1 through 23 including the step of blowing oxygen into said convertor, said oxygen being loaded with solids in powder form.

25. A process according to any of claims 1 through 24, wherein when oxygen is blown into said convertor through said tuyeres said tuyeres, are protected with a sheath of inert gases, carbon dioxide, water or water vapor or hydrocarbons such as fuel oil, natural gas, methane, propane and butane.

26. A process according to any of claims 1 through 25 including the steps of blowing powder carbon carriers and subsequently a combustible or inert gas into the melt through said tuyeres concentrically with respect to the oxygen.

27. A process according to any of claims 1 through 26 including the steps of blowing oxygen into the convertor above and below the bath surface.

28. A process according to any of claims 1 through 27 which includes the step of blowing oxygen surrounded by a protective medium into the convertor above the bath surface.

29. A process according to any of claims 1 through 28 which includes the step of burning carbon monoxide above the bath surface in the convertor by means of oxygen.

30. A process according to any of claims 1 through 30, wherein preheating of scrap in the convertor in the manner described thereby producing a steel melt from a charge containing an increased percentage of scrap of up to 10%, for instance 40% in lieu of 30% of scrap in the conventional oxygen refining process, referred to the weight of steel, and with correspondingly diminished amounts of pig iron.

31. A process according to any of claims 1 through 30 which includes preheating the scrap in the convertor in the manner desdescribed and adding coke after the scrap preheating, during the premelting phase in the convertor, thereby producing from a charge containing an increased percentage of scrap more than 10% greater than the scrap charged in a conventional process, for instance with more than 40% of scrap referred to the weight of steel.

32. A process according to any of claims 1 through 30 wherein the steel is produced from a charge in which the iron source material consists solely of solid iron sources, for instance scrap, and the process comprises preheating the scrap and adding solid carbon carriers, for instance coke, to the preheated scrap, following the scrap preheating in the convertor.

* * * * *